April 19, 1938. J. M. GWINN, JR 2,114,839
AIRCRAFT WHEEL MECHANISM
Filed April 24, 1934
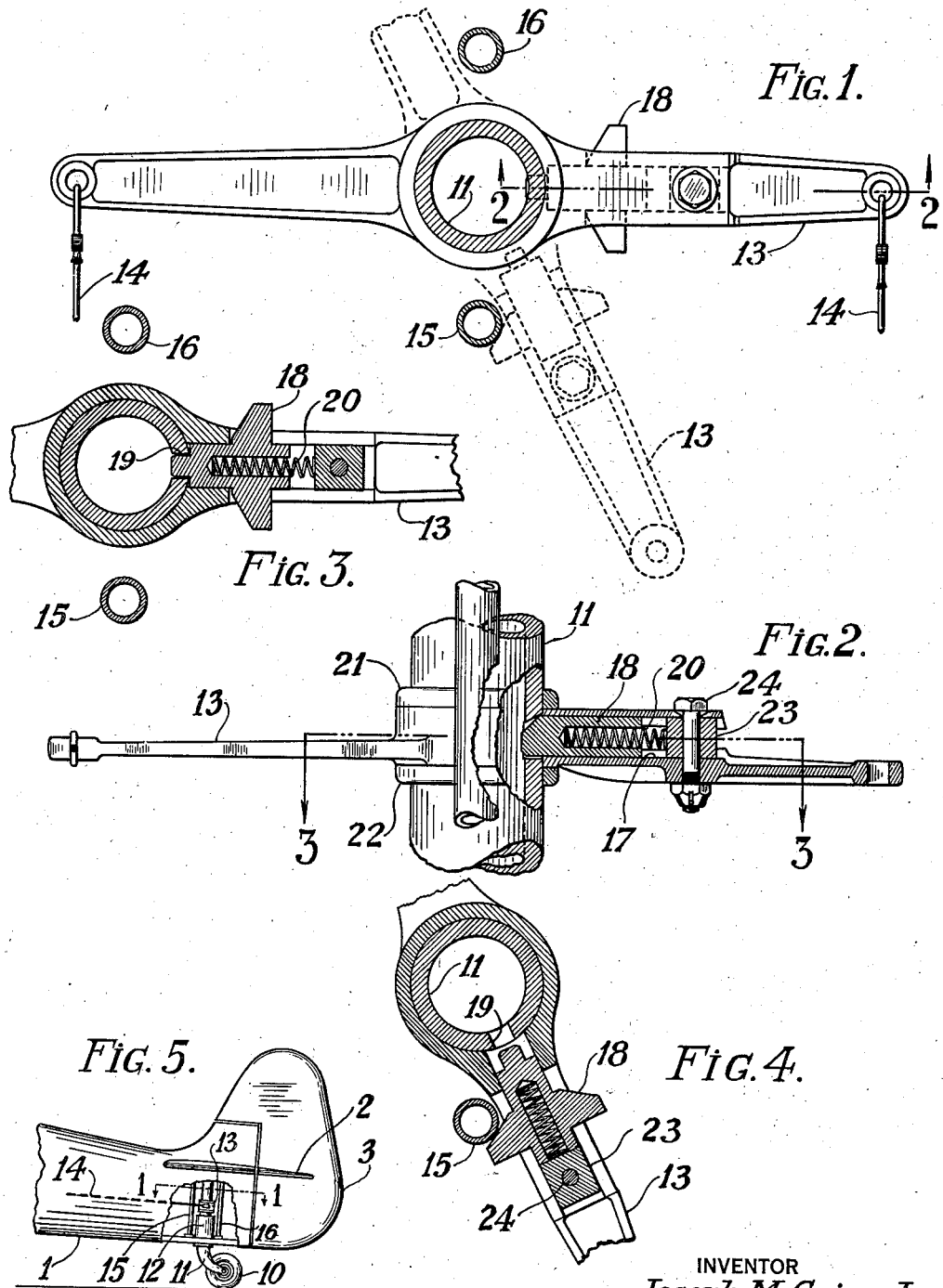
INVENTOR
Joseph M. Gwinn, Jr.
BY
John A. Sanborn
ATTORNEY Patented Apr. 19, 1938

2,114,839

UNITED STATES PATENT OFFICE 2,114,839

AIRCRAFT WHEEL MECHANISM

Joseph M. Gwinn, Jr., Buffalo, N. Y., assignor to Consolidated Aircraft Corporation, a corporation of Delaware Application April 24, 1934, Serial No. 722,105

6 Claims. (Cl. 244—109)

This invention relates to the steering of aircraft while being maneuvered on the ground, and more particularly to a means for preventing strain or damage to the steering mechanism due to excessive angular throw of the tail wheel or skid.

In maneuvering an airplane about on the ground, such as in backing into a hangar or in taxiing into position for a take-off, it often occurs that the tail wheel or skid will swing through a complete circle relative to a generally vertical axis if it is of the free swinging caster type. This movement is desirable under these conditions so as to permit the necessary maneuvering of the airplane.

In addition, in a steerable tail wheel or skid, it is also common practice to provide an elastic means to limit the swing or throw as well as to return the wheel or skid to its normal position. Steering mechanisms of these types, however, have the disadvantage that there is a limit to the deflection which they will permit, and if the wheel or skid is pivoted to turn through a complete circle, the steering mechanism will probably be permanently deformed with resulting damage to the tail wheel assembly.

It is, therefore, desirable to provide suitable releasing mechanism to disengage the steering control apparatus to permit the tail wheel or skid to swing freely in any direction. Although both manually and automatically releasable mechanisms of this character have been previously proposed for such purposes, they have not proven entirely satisfactory in actual practice.

It is, therefore, an object of this invention to provide a simple, light and inexpensive automatic release mechanism for normally steerable tail wheels or skids.

It is a further object of this invention to provide positive steering control of the tail or skid throughout the range of the movement to which the same would be subjected under ordinary conditions of service.

Another object of the invention relates to the automatic reengagement of the control when the condition which caused the same to be released no longer exists.

Still another object of the invention resides in the provision of means whereby the steering control may be disengaged or released under certain conditions, such disengagement being accomplished automatically in response to a displacement of the wheel or skid corresponding to such condition.

It is a still further object of this invention to provide a steerable release mechanism which is readily adaptable to the oleo and other conventional types of shock absorbers commonly used in present practice in connection with tail wheels and skids.

Other no less important objects will appear from a reading of the annexed specification and claims, and from an examination of the drawing forming a part hereof, it being understood that the embodiment of the invention shown and described herein is by way of an example only and that other forms coming within the scope of the claims are intended to be included herein.

In the accompanying drawing, in which like characters of reference indicate corresponding parts in all the views:

Fig. 1 is a plan in section taken in the plane of the line 1—1 in Fig. 5, of a steerable tail wheel post and steering mechanism showing in solid lines the normal position of the steering member and in dotted lines one of the extreme positions;

Fig. 2 is a view in elevation of the same partly in section, the section being taken through the line 2—2 indicated in Fig. 1;

Fig. 3 is a fragmentary sectional plan showing the steering member engaged to the wheel post, the section being taken through the line 3—3 indicated in Fig. 2;

Fig. 4 is a fragmentary sectional plan showing the same in the disengaged position, the section being taken through the same plane as Fig. 3, but in the position indicated by the dotted lines in Fig. 1; and Fig. 5 shows the tail portion of an airplane in which an embodiment of this invention is indicated.

Referring to the drawing, Fig. 5 shows the fuselage 1 of a conventional type airplane to which are attached horizontal stabilizing surface and elevator 2, and rudder 3. In the portion of this figure where the fuselage surface is cut away, a typical embodiment of the invention is shown as applied to a full-castering steerable tail wheel assembly in which a pneumatic-tired wheel 10 is pivoted in the fork at the lower end of the generally vertical tail wheel post or pivot 11, which is associated with a shock absorber 12.

The steering control member 13 is rotatably mounted upon the tail wheel post 11 and is restrained from moving upwardly or downwardly relative to the tail post 11 by collars 21 and 22 (referring to Figs. 1 to 4 inclusive) which are fixedly mounted upon the tail post 11. The shock absorber 12 may be either of the oleo or other conventional type and may be located either above or below the control member 13 in which latter case a suitable guide bearing (not shown) would be provided through which the tail wheel post would pass through the bottom of the fuselage. Control cables 14 are fastened to the ends of the control member 13, the same being carried forward to the controls in the pilot's cockpit. Stop members 15 and 16 are mounted adjacent and parallel to the post member 11, their relative positions being more clearly shown in Figs. 1 and 3. Such members, if desirable, may form a part of the fuselage framework.

In one of the lever arms of the control member a recess 17 is provided to house and guide the latching mechanism composed of a latch 18 having a tongue or key formed on the end thereof and shaped to engage a correspondingly shaped opening or keyway 19 provided in the tail wheel post 11, both key and keyway being bevelled as shown to facilitate said engagement. The latch 18 is provided with a wedge shaped lug or projection on each side with the wedging surfaces of the lugs angularly disposed so as to contact the post members 15 and 16 referred to above, in certain positions of the control member 13.

The latch 18 has a recess formed therein into which a compression spring 20 fits to impart to the latch a tendency to engage and remain in such engagement with the opening 19 in the tail post. The other end of the spring is restrained by the block 23 which is fixedly attached to the control member 13 by the through bolt and nut 24.

With the tail wheel trailing in its normal central position as is obtained from a directly forward motion of the airplane, the steering control member 13 would be in the position shown by the solid lines in Fig. 1, or in perpendicular relation to the axis or center line of the airplane. In this position and in all other positions intermediate of the extreme positions, of which the dotted lines of the same figure are indicative, the steering control member is in positive engagement with the tail post and its attached wheel through the latch 18 having its tongue inserted within the opening 19 in the tail wheel post 11 due to the constant pressure maintained by the spring 20. In this position met with in all conditions of normal operation any pull upon the control cables 14 will produce a corresponding turning effect upon the tail post and a change in the angular direction of the tail wheel and likewise any disturbing force against the tail wheel, such as striking an object on the ground or becoming caught in a rut will cause a corresponding tendency to rotate the control member, which if only caused to swing within its normal limits will remain engaged or operable with the tail wheel. This eliminates any necessity of any elastic means for returning the tail wheel to its normal position for reengagement to the steering control and also avoids the loss of steerability of the tail wheel due to the disengagement resulting from a normal disturbing force or a blow against the tail wheel as in the case of devices of this nature which have been previously proposed.

If, however, the disturbing blow exceeds a predetermined magnitude, the control member 13 is caused to swing into one of the positions indicated by the dotted lines in Fig. 1 and as shown more in detail in Fig. 4. It will be seen that as the control member rotates against the post member 15, the angular surface of the latch 18 rides up on the stop member and due to the resulting cam action, the latch moves outwardly overcoming the force of the spring and pulling the tongued end or key from the opening in the tail wheel post 11, thereby disengaging the control member 13 and permitting the tail wheel to swing completely through 360 degrees or to any extent which the abnormal disturbing force may cause it to be deflected.

When the disturbing force referred to has been spent and conditions have been restored to normal, the tail wheel, due to forward movement of the airplane on the ground resulting from the swiveling or castering effect, returns the tail wheel post to its normal position where the action of the spring, which has in the meantime been released when member 13 was no longer held against post member 15, causes reengagement of the latch key with the opening 19 in the post member, thereby causing the tail wheel to be controllable and steerable until automatically released by another subsequent disturbing force.

Should the tail wheel be released during the take-off, the drag on the tail wheel, due to air velocity and propeller slipstream, swings the wheel to its normal position where it is reengaged by the control member when the latter is also in its normal position for straight flight.

Stop members 15 and 16 may or may not be a part of the supporting structure of the tail wheel. Since the steering control member 13 is retained on the post members by collars 21 and 22 and since the post or pivot member at times will have an axial movement due to shock absorber action, the control member 13 must also partake of this actual movement and stop members 15 and 16 are extended a sufficient distance to permit of this shock absorber travel. In other modifications of my invention the post members can be either projections of the shock absorber or extending lugs or posts on a tail post guide bearing.

If desired, the latch may be housed within a separate extension provided on the hub of the control member instead of within one of the lever arms.

In another modification of my invention, the retaining collars 21 and 22 may be omitted and the control member is restrained in the direction of shock absorber travel in which case stop members 15 and 16 need not be extended but the keyway 19 in the post member would be extended in an axial direction sufficiently to allow for the relative motion between the control and post members. In a construction of this character, the control member may be adapted to operate within and be restrained by a tail post guide bearing which would also provide the stop members 15 and 16.

It is to be understood that the drawing and the above description are for purposes of illustration only and various changes and modifications which may occur to one skilled in the art are to be considered within the spirit and scope of this invention.

I claim as my invention:

1. In a releasable tail wheel steering mechanism for aircraft, a rotatable tail post having an externally recessed portion, a control member engaging said tail post about its recessed portion, a stop member fixed to the aircraft, a latch member guided by said control member for radial movement with respect to the tail post, the said latch member normally engaging the said recessed portion thereby locking the control member to the tail post for rotation therewith, the said latch member being organized to move radially upon contact with said stop member at predetermined limits of said rotation whereby the control member is disengaged from said tail post.

2. In a steerable tail wheel for aircraft a releasing mechanism comprising a rotatable tail post having an externally recessed portion, a control member having a hub portion engaging said tail post about its recessed portion, a stop member fixed to the aircraft, a latch member guided for radial movement through the said hub portion, the said latch member having a tongue normally engaging the said recessed portion for locking the control member to the tail post and a cam portion adapted to engage the said stop member upon rotation of the control member beyond predetermined limits whereby the said latch is caused to move radially outwardly in disengagement from the said recessed portion.

3. In a steerable tail wheel for aircraft, the combination of a coaxially mounted shock absorber with a releasing mechanism comprising a rotatable tail post having an externally recessed portion, a control member having a hub portion engaging said tail post about its recessed portion, a stop member fixed to the aircraft, a latch member guided for radial movement through the said hub portion, the said latch member having a tongue normally engaging the said recessed portion for locking the control member to the tail post and a cam portion adapted to engage the said stop member upon rotation of the control member beyond predetermined limits whereby the said latch member is caused to move radially outwardly in disengagement from the said recessed portion throughout all deflected conditions of the said shock absorber.

4. In a steerable ground-engaging wheel for aircraft, a wheel-carrying member journalled for castering rotation with respect to said aircraft, a control member coaxially mounted upon the first said member for steering said wheel, latching means carried by said control member movable radially with respect to the axis thereof and adapted to engage a recessed portion of the first said member for steering movements therewith, stop means interposed in the rotational path of the said latching means at predetermined limits, means to rotate the said control member to steer said wheel under normal conditions within the said predetermined limits, and cam means associated with the said latching means such that contact with the stop means at a predetermined limit of its rotational path causes radial movement of the latching means from within the said recessed portion resulting in free castering of the said wheel without attendant control of said control member.

5. In a steerable tail wheel for aircraft, a releasing mechanism comprising a rotatable tail post having an externally recessed portion, a control member having two radially opposed arms engaging said tail post about its recessed portion, stop members fixed to the aircraft, a latch member guided within one of the said arms for radial movement with respect to the axis of the tail post, the said latch member comprising an inwardly extending tongue portion and laterally extending cam portions, spring means urging the latch member radially inwardly for engagement of the tongue and recessed portions for normally locked rotation of the tail post, such that rotation beyond predetermined limits causes engagement of one of the said cam portions with a stop member whereby the said latch member is moved radially outwardly within said control arm and against the action of the said spring means thereby unlocking the control member by removal of the tongue portion from the said recessed portion of the tail wheel.

6. In an airplane, in combination, a rotatable tail post having a radially disposed recess therein, a ground engaging member associated with said tail post, a steering member rotatably associated with said tail post, fixed stops associated with the airplane and positioned to determine the normal rotational movement of said steering member, means for automatically locking and unlocking said tail post with said steering member, the said means comprising a radially moveable latch associated with the said steering member and positioned to externally engage the tail post recess, a spring adapted to urge the said latch radially inwardly toward said tail post, and cam-shaped ears associated with said latch and positioned to strike the said fixed stops when the steering member is caused to rotate beyond its normal movement, the said means being so organized as to cause radially outward movement and disengagement of said latch from the said tail post recess when a latch ear strikes either of said stops and thereby causes the said steering member and tail post to become unlocked with respect to each other.

JOSEPH M. GWINN, Jr.